US011251972B2

(12) United States Patent
Blackie et al.

(10) Patent No.: US 11,251,972 B2
(45) Date of Patent: Feb. 15, 2022

(54) REMOTE CONTROL OF A COMPUTING DEVICE

(71) Applicant: VNC AUTOMOTIVE LIMITED, Cambridge (GB)

(72) Inventors: Thomas Blackie, Cambridge (GB); Laurent Cremmer, Cambridge (GB); Alberto Bonamico, Cambridge (GB)

(73) Assignee: VNC Automotive Limited, Cambridge (GB)

( * ) Notice: Subject to any disclaimer, the term of this patent is extended or adjusted under 35 U.S.C. 154(b) by 189 days.

(21) Appl. No.: 16/635,632

(22) PCT Filed: May 17, 2018

(86) PCT No.: PCT/GB2018/051335
§ 371 (c)(1),
(2) Date: Jan. 31, 2020

(87) PCT Pub. No.: WO2019/025749
PCT Pub. Date: Feb. 7, 2019

(65) Prior Publication Data
US 2021/0126795 A1    Apr. 29, 2021

(30) Foreign Application Priority Data
Aug. 2, 2017  (GB) .................................. 1712441

(51) Int. Cl.
*H04L 9/32* (2006.01)
*H04L 29/08* (2006.01)
(Continued)

(52) U.S. Cl.
CPC .......... *H04L 9/3247* (2013.01); *H04L 67/125* (2013.01); *H04L 67/141* (2013.01)

(58) Field of Classification Search
CPC ... H04L 9/3247; H04L 67/125; H04L 67/141; H04L 67/08; H04L 63/0823;
(Continued)

(56) References Cited

U.S. PATENT DOCUMENTS

| 9,413,538 | B2 * | 8/2016 | Baumann | ............... | G06F 21/577 |
| 2008/0270512 | A1 * | 10/2008 | Guo | ...................... | G06F 3/1423 |
| | | | | | 709/201 |

(Continued)

OTHER PUBLICATIONS

"Publicly Available Specification (PAS); Intelligent Transport Systems (ITS); MirrorLink; Part 14: Application Certificates", ETSI Draft Specification; 103 544-14, European Telecommunications Standards Institute (ETSI), 650, Route Des Lucioles; F-06921 Sophia-Antipolis; France, vol. TC ITS Intelligent Transport Systems, No. V0.0.1, Jun. 12, 2017 (Jun. 12, 2017), pp. 1-35, XP014303822, Retrieved from the Internet: URL:docbox.etsi.org/ITS/ITS/70-Drafts/0088-14/ITS-88-14v001.docx [retrieved on Jun. 12, 2017].
(Continued)

*Primary Examiner* — Alina A Boutah
(74) *Attorney, Agent, or Firm* — Loginov & Associates. PLLC; William A. Loginov

(57) ABSTRACT

A method of establishing a remote control session between a first computing device and a second computing device to enable a graphical user interface of an application executed by a processor of the first computing device to be remotely controlled and viewed on the second computing device, the method implemented on the first computing device and comprising: establishing a connection with a bridging module, the bridging module external to the first computing device; performing an authentication procedure with the bridging module using the connection; establishing a secure communication channel to the bridging module on the connection; receiving, from the bridging module, an authentication request transmitted from the second computing
(Continued)

device; in response to receiving the authentication request (i) accessing a projection certificate chain stored in a secure data store of the bridging module using the secure communication channel, (ii) generating a response including the projection certificate chain, and (iii) instructing, via the secure communication channel, the bridging module to cryptographically sign the response using a private key which is associated with the bridging module and is stored in the secure data store, and in response receiving a signature from the bridging module via the secure communication channel; and transmitting a signed authentication response to the second computing device via the bridging module to establish the remote control session, the signed authentication response comprising the projection certificate chain and the signature.

23 Claims, 12 Drawing Sheets

(51) Int. Cl.
*H04W 4/40* (2018.01)
*G06F 9/451* (2018.01)
*G06F 21/33* (2013.01)
*H04L 29/06* (2006.01)
*G06F 3/14* (2006.01)

(58) Field of Classification Search
CPC ...... H04L 63/0884; H04W 4/40; G06F 9/452; G06F 21/33; G06F 3/1454
See application file for complete search history.

(56) References Cited

U.S. PATENT DOCUMENTS

| | | | | |
|---|---|---|---|---|
| 2008/0320566 A1* | 12/2008 | Herzog | ............... | G06F 21/33 726/4 |
| 2010/0226628 A1* | 9/2010 | Yamaji | ............... | H04N 9/8227 386/353 |
| 2011/0154465 A1* | 6/2011 | Kuzin | ............... | H04L 67/08 726/9 |
| 2012/0084570 A1* | 4/2012 | Kuzin | ............... | G06F 21/41 713/182 |
| 2013/0013923 A1* | 1/2013 | Thomas | ............... | H04W 12/06 713/168 |
| 2014/0108785 A1* | 4/2014 | Lindteigen | ............... | H04L 63/062 713/156 |
| 2014/0179274 A1* | 6/2014 | O'Meara | ............... | H04W 76/10 455/411 |
| 2014/0277937 A1* | 9/2014 | Scholz | ............... | H04W 4/50 701/36 |
| 2014/0310787 A1* | 10/2014 | Morley | ............... | H04L 63/08 726/6 |
| 2015/0052447 A1* | 2/2015 | Ritesh | ............... | H04L 41/22 715/740 |
| 2015/0189462 A1* | 7/2015 | Fujii | ............... | H04W 4/80 455/41.2 |
| 2015/0222517 A1* | 8/2015 | McLaughlin | ............... | H04L 67/04 713/156 |
| 2016/0094539 A1* | 3/2016 | Suresh | ............... | H04L 63/0272 726/7 |
| 2016/0094546 A1* | 3/2016 | Innes | ............... | G06F 21/33 713/156 |
| 2016/0170619 A1* | 6/2016 | Bai | ............... | H04L 67/125 715/771 |
| 2016/0182473 A1* | 6/2016 | Cignetti | ............... | H04L 63/0823 713/171 |
| 2016/0342784 A1* | 11/2016 | Beveridge | ............... | G06F 21/34 |
| 2016/0344819 A1* | 11/2016 | Beveridge | ............... | H04L 67/08 |
| 2016/0378535 A1* | 12/2016 | Oh | ............... | G06F 9/452 718/1 |
| 2017/0169227 A1* | 6/2017 | Rajcan | ............... | H04L 63/08 |
| 2017/0201491 A1* | 7/2017 | Schmidt | ............... | H04L 65/1069 |
| 2017/0201588 A1* | 7/2017 | Schmidt | ............... | H04L 63/0876 |
| 2017/0324566 A1* | 11/2017 | Kawasaki | ............... | H04L 63/0272 |
| 2018/0007059 A1* | 1/2018 | Innes | ............... | G06F 21/6218 |
| 2018/0083919 A1* | 3/2018 | Kane | ............... | H04L 61/30 |
| 2018/0084412 A1* | 3/2018 | Alfred | ............... | H04L 9/088 |
| 2018/0152300 A1* | 5/2018 | Rossi | ............... | H04L 63/0853 |
| 2018/0212782 A1* | 7/2018 | Csik | ............... | G06F 21/6272 |
| 2018/0351941 A1* | 12/2018 | Chhabra | ............... | H04L 9/3234 |
| 2019/0034612 A1* | 1/2019 | Smales | ............... | H04W 12/00 |
| 2020/0320199 A1* | 10/2020 | Sheth | ............... | H04L 9/0841 |
| 2021/0011991 A1* | 1/2021 | Schmitz | ............... | H04L 9/0643 |

OTHER PUBLICATIONS

"Publicly Available Specification (PAS); Intelligent Transport Systems (ITS); MirrorLink; Part 10: UPnP Client Profile Service", ETSI Draft Specification; 103 544-10, European Telecommunications Standards Institute (ETSI), 650, Route Des Lucioles; F-06921 Sophia-Antipolis; France, vol. TC ITS Intelligent Transport Systems, No. V0.0.1, Jun. 12, 2017 (Jun. 12, 2017), pp. 1-27, XP014302889, Retrieved from the Internet: URL:docbox.etsi.org/ITS/ITS/70-Drafts/ 0088-10/ITS-88-10v001.docx [retrieved on Jun. 12, 2017].

* cited by examiner

REMOTE CONTROL OF A COMPUTING DEVICE

FIELD OF THE INVENTION

The present invention relates to a method and system for remote controlling and/or viewing a computing device.

BACKGROUND

It is known to use a first computer device to view and control a second computer device using a Virtual Network Computing (VNC) Viewer application running on the first computer device (VNC Viewer) and a VNC Server application running on the second computer device (VNC Server). The contents of the display of the second computer device are duplicated on the first computer device. The first computer device has an interface mechanism which allows the user to send user input events, such as pressing a physical key on the device, moving the mouse cursor or touching a touch screen input, to the second computer device being controlled. As will be appreciated, the form of data link and the nature of the computer devices can vary, depending on the situation being used.

Smart device in-vehicle application projection technologies such as MirrorLink allow an application running on a smart device such as, but not limited to, a smartphone to be displayed and used in a vehicle using the vehicle's native display and control mechanism.

From the point of view of the smart device the vehicle is abstracted behind a technology specific hardware and software interface specification.

Current smart device in-vehicle application projection technology rely on (i) a physical connection between devices, usually controlled in system space on the sender (VNC Server), (ii) an authentication layer, mandating the use of a secure element, usually controlled in system space on the sender, to store trusted certificate chains or other means of authentication, and (iii) a system component to be integrated in the sender, that must be used by applications to enable projection.

SUMMARY OF THE INVENTION

According to one aspect of the present invention there is provided a method of establishing a remote control session between a first computing device and a second computing device to enable a graphical user interface of an application executed by a processor of the first computing device to be remotely controlled and viewed on the second computing device, the method implemented on the first computing device and comprising: establishing a connection with a bridging module, the bridging module external to the first computing device; performing an authentication procedure with the bridging module using the connection; establishing a secure communication channel to the bridging module on the connection; receiving, from the bridging module, an authentication request transmitted from the second computing device; in response to receiving the authentication request (i) accessing a projection certificate chain stored in a secure data store of the bridging module using the secure communication channel, (ii) generating a response including the projection certificate chain, and (iii) instructing, via the secure communication channel, the bridging module to cryptographically sign the response using a private key which is associated with the bridging module and is stored in the secure data store, and in response receiving a signature from the bridging module via the secure communication channel; and transmitting a signed authentication response to the second computing device via the bridging module to establish the remote control session, the signed authentication response comprising the projection certificate chain and the signature.

The accessing the projection certificate chain may comprise transmitting a request for the projection certificate chain to the bridging module via the secure communication channel, and receiving the projection certificate chain from the bridging module via the secure communication channel.

The performing the authentication procedure may comprise: retrieving a certificate chain associated with the first computing device from storage on the first computing device; signing the certificate chain associated with the first computing device with a private key associated with the first computing device; and transmitting the signed certificate chain to the bridging module for validation by the bridging module, said private key stored in the memory on the first computing device.

Performing the authentication procedure may comprise: receiving a signed certificate chain associated with the bridging module together with a public key associated with the bridging module; and validating the certificate chain associated with the bridging module using a root certificate stored in memory on the first computing device.

The establishing a secure communication channel to the bridging module on the connection may comprise: generating at least one symmetric encryption key; encrypting said at least one symmetric encryption key using a public key associated with the bridging module to generate at least one encrypted symmetric encryption key; and transmitting the at least one encrypted symmetric encryption key to the bridging module.

The method may further comprise invalidating the at least one symmetric encryption key in response to detecting loss of said connection.

The method may further comprise: receiving a request, from the bridging module, to initiate projection of said graphical user interface to the second computing device, the request originating from the second computing device; and transmitting a command to the bridging module to set up a bridge to allow data to be routed between the first computing device and the second computing device.

The establishing the connection with the bridging module may be in response to user input received at the first computing device.

A bridging device external to both the first computing device and the second computing device may comprise the bridging module, said establishing a connection with the bridging module comprising establishing a connection with the bridging device.

The second computing device may comprise the bridging module, said establishing a connection with the bridging module comprising establishing a connection with the second computing device.

The connection established with the bridging module may be a wireless connection.

The wireless connection may be established in accordance with a peer to peer wireless protocol. The wireless connection may be a Wi-Fi Direct connection or a Bluetooth connection The connection established with the bridging module may be a wired connection.

The second computing device may be a vehicle head unit integrated into a vehicle, the vehicle head unit comprising a display for displaying the graphical user interface of said application.

The first computing device may be a mobile computing device, the mobile computing being one of a mobile telephone, laptop computer, tablet computer and a headless computing device.

According to another aspect of the present invention there is provided a computer program product for establishing a remote control session between a first computing device and a second computing device to enable a graphical user interface of an application executed by a processor of the first computing device to be remotely controlled and viewed on the second computing device, the computer program product comprising code embodied on a non-transient computer-readable medium and configured so as when executed on a processor of the first computing device to perform the method steps described herein.

The code may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

According to another aspect of the present invention there is provided a computing device comprising: a processor configured to run an application for establishing a remote control session between the computing device and a second computing device to enable a graphical user interface of a user application executed by the processor of the computing device to be remotely controlled and viewed on the second computing device, wherein the application is configured to: establish a connection with a bridging module, the bridging module external to the computing device; perform an authentication procedure with the bridging module using the connection; establish a secure communication channel to the bridging module on the connection; receive, from the bridging module, an authentication request transmitted from the second computing device; in response to receiving the authentication request (i) access a projection certificate chain stored in a secure data store of the bridging module using the secure communication channel, (ii) generate a response including the projection certificate chain, and (iii) instruct, via the secure communication channel, the bridging module to cryptographically sign the response using a private key which is associated with the bridging module and is stored in the secure data store, and in response receive a signature from the bridging module via the secure communication channel; and transmit a signed authentication response to the second computing device via the bridging module to establish the remote control session, the signed authentication response comprising the projection certificate chain and the signature.

According to another aspect of the present invention there is provided a method of establishing a remote control session between a first computing device and a second computing device to enable a graphical user interface of an application executed by a processor of the first computing device to be remotely controlled and viewed on the second computing device, the method implemented on a bridging module and comprising: establishing a connection with the first computing device, the bridging module external to the first computing device; performing an authentication procedure with the first computing device using the connection; establishing a secure communication channel to the first computing device on the connection; transmitting an authentication request received from the second computing device to the first computing device; receiving a request from the first computing device via the secure communication channel, for a projection certificate chain stored in a secure data store of the bridging module, and in response retrieving the projection certificate chain from the secure data store and transmitting the projection certificate chain to the first computing device via the secure communication channel; receiving a response including the projection certificate chain and a request to sign said response, from the first computing device via the secure communication channel; cryptographically signing the response using a private key associated with the bridging module and which is stored in the secure data store to generate a signature for the first computing device, and transmitting the signature to the first computing device via the secure communication channel; and transmitting a signed authentication response received from the first computing device to the second computing device to establish the remote control session, the signed authentication response comprising the projection certificate chain and the signature.

The performing the authentication procedure may comprise: receiving a signed certificate chain associated with the first computing device from the first computing device; and validating the certificate chain associated with the first computing device using a root certificate stored in said secure data store.

The performing the authentication procedure may comprise: retrieving a certificate chain associated with the bridging module from said secure data store; signing the certificate chain associated with the bridging module with a private key associated with the bridging module; and transmitting the signed certificate chain to the first computing device for validation by the first computing device, said private key stored in said secure data store.

The method may comprise establishing a bridge to allow data to be routed between the first computing device and the second computing device.

Following the establishment of the bridge, the method may comprise: receiving data in a first format from the second computing device for transmission to the first computing device and relaying said data in a second format to the first computing device; and receiving data in the second format from the first computing device for transmission to the second computing device and relaying said data in the first format to the second computing device.

The first format and the second format may be the same.

Alternatively, the first format and the second format may be different, the method comprising performing a translation of the data between the first format and the second format.

The method may further comprise: transmitting a request to the first computing device to initiate projection of said graphical user interface to the second computing device, the request originating from the second computing device; and in response, receiving a command from the first computing device to set up the bridge to allow data to be routed between the first computing device and the second computing device.

The connection established with the first computing device may be a wired or a wireless connection.

According to another aspect of the present invention there is provided a bridging module for establishing a remote control session between a first computing device and a second computing device to enable a graphical user interface of an application executed by a processor of the first computing device to be remotely controlled and viewed on the second computing device, wherein the bridging module is configured to: establish a connection with the first computing device, the bridging module external to the first computing device; perform an authentication procedure with the first computing device using the connection; establish a secure communication channel to the first computing device on the connection; transmit an authentication request received from the second computing device to the first computing device; receive a request from the first computing device via the secure communication channel, for a projection certificate chain stored in a secure data store of the bridging module, and in response retrieve the projection certificate chain from the secure data store and transmit the projection certificate chain to the first computing device via the secure communication channel; receive a response including the projection certificate chain and a request to sign said response, from the first computing device via the secure communication channel; cryptographically sign the response using a private key associated with the bridging module and which is stored in the secure data store to generate a signature for the first computing device, and transmit the signature to the first computing device via the secure communication channel; and transmit a signed authentication response received from the first computing device to the second computing device to establish the remote control session, the signed authentication response comprising the projection certificate chain and the signature.

The bridging module may be integrated into a bridging device, the bridging device external to both the first computing device and the second computing device.

The bridging module may be integrated into the second computing device.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 1:
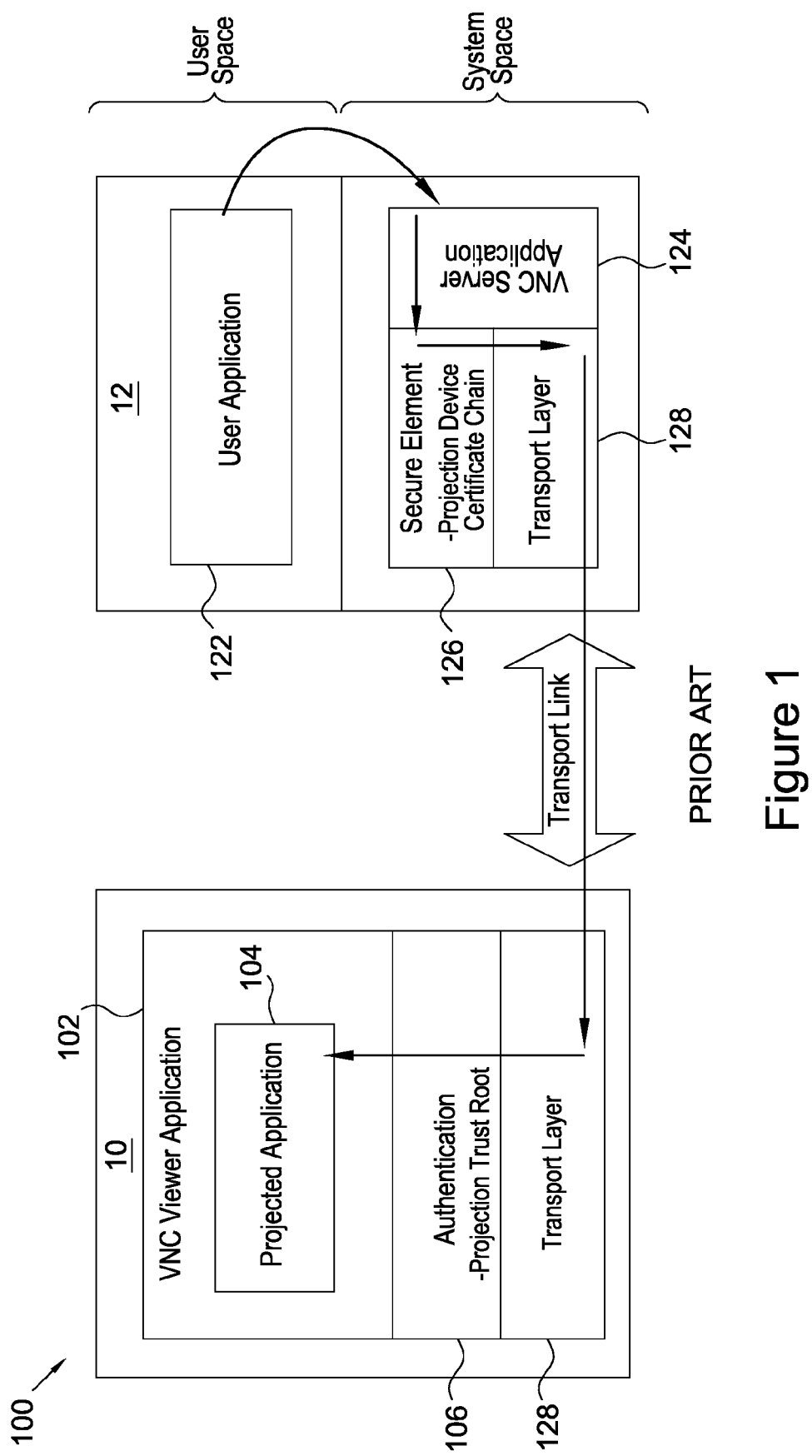
FIG. 1 is schematic block diagram of a known in-vehicle application projection technology implementation.

A schematic block diagram of a known in-vehicle application projection technology implementation 100 is shown in FIG. 1.

As shown in FIG. 1, a user application 122 (e.g. a navigation application, a communication application, a music application etc.) is running in user space on a mobile computing device 12.

To project the graphical user interface of the user application 122 that is displayed on a display of the mobile computing device 12 on a display of a remote computing device 10 e.g. a vehicle head unit integrated into a vehicle, a VNC Server Application 124 running in system space (e.g. on an Android™ operating system) on the mobile computing device 12 is used to capture an image displayed on the display of the mobile computing device and send it via a transport link (e.g. a USB cable) to the remote computing device 10; thus the mobile computing device 12 may be termed a VNC server since it is sending information to be viewed on the remote computing device 10. A corresponding VNC viewer application 102 is running on the remote computing device 10 to receive the image of the display of the mobile computing device 12 and output it on a display on the remote computing device 10; thus the remote device may be termed a VNC viewer.

As is well known to persons skilled in the art, a modern computing device operating system usually segregates virtual memory into system space and user space. Primarily, this separation serves to provide memory protection and hardware protection from malicious or errant software behaviour. System space is strictly reserved for running a privileged operating system kernel, kernel extensions, and most device drivers. In contrast, user space is the memory area where application software and some drivers execute.

By remote computing device, it is meant any device which is physically remote from the mobile computing device. The remote computing device may be located a considerable distance away from the mobile device or may be located close by (e.g. both within a vehicle).

Known MirrorLink in-vehicle application projection technology relies on:

The use of USB CDC/NCM (Universal Serial Bus Communication Device Class Network Control Mode) as a transport layer 128, however this is not natively supported by known operating systems such as Android™, and is not readily available to the VNC Server Application 124;

An authentication layer, mandating the use of a private key/public key pair and a projection device certificate chain stored securely in a secure data store 126 on the smart device, the projection device certificate chain leading back to a Car Connectivity Consortium (CCC) Trust Root certificate 106 stored on the computing device 10; and A MirrorLink Server (e.g. a VNC Server Application 124) with system privileges, able to access the secure data store 126 to retrieve the projection device certificate chain, sign exchanges, and able to forward the graphical user interface of the user application 122 to the MirrorLink Client (e.g. a VNC viewer application 102) using a system level API.

Thus taking the example of the mobile computing device 12 being a mobile telephone. In order to implement the MirrorLink in-vehicle application projection technology, the vendor of the mobile telephone must modify the operating system running on the mobile telephone to add the required USB protocols and to also get the mobile telephone certified e.g. DAP (device attestation protocol) certified such that the secure data store 126 stores the projection device certificate chain so that the mobile telephone can present itself as a certified MirrorLink Server device to the vehicle head-unit.

Embodiments of the present invention overcome the hardware bound limitations of known solutions.

Figure 2:
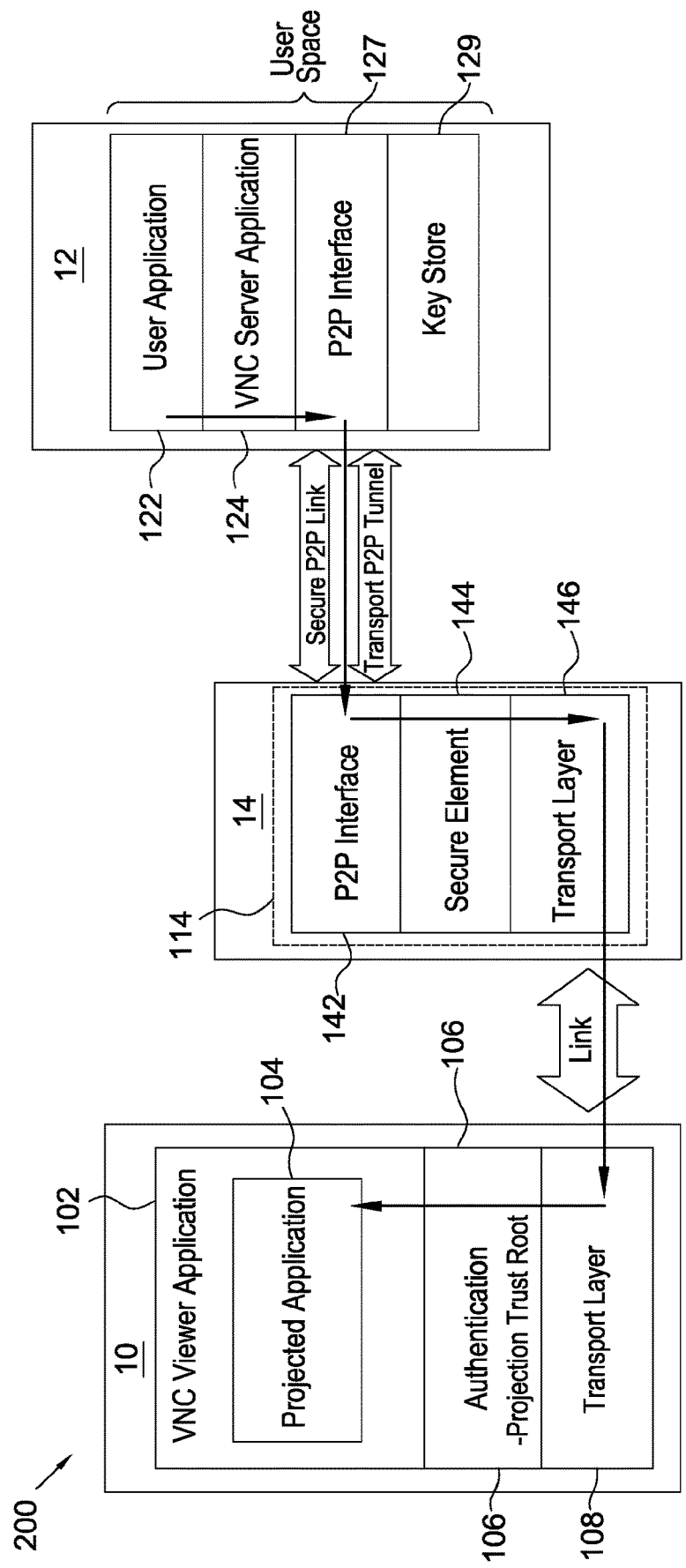
FIG. 2 is a schematic block diagram of an in-vehicle application projection technology implementation in accordance with embodiments of the present invention.

A schematic block diagram of an in-vehicle application projection technology implementation 200 in accordance with embodiments of the present invention is shown in FIG. 2.

The computing device 10 (otherwise referred to herein as a second computing device) shown in FIG. 2 is the same as the computing device 10 shown in FIG. 1.

In embodiments of the present invention, a bridging module 114 becomes responsible to implement hardware and software system functions that would normally be built-in in the mobile computing device 12 (otherwise referred to herein as a first computing device and a smart device) at a system level.

As shown in FIG. 2, a bridging device 14 may comprise the bridging module 114. In these embodiments the bridging device 14 is a standalone device (external to both the computing device 10 and mobile computing device 12) that is arranged to communicate with both the computing device 10 and mobile computing device 12.

Thus the bridge device 14 comprises a transport component 146 matching the transport requirement 108 of the target viewer; a secure data store (e.g. a secure element) 144 providing storage, encryption and signing operations matching the security requirements of the mobile computing device projection technology e.g. MirrorLink; and a secured P2P communication interface 142 and API allowing the VNC Server Application 124 running on the mobile computing device 12 to make use of the bridge device's transport 146 and secure element 144 to act as a smart device projection technology compliant server.

The bridge device 14 connects to the computing device 10. The bridge device 14 may be configured to connect to the computing device 10 using a wired connection. For example, the bridge device 14 may take the form a dongle that is to be plugged into a port (e.g. a USB port) on the computing device 10. The bridge device 14 may be configured to communicate with the computing device 10 using an Ethernet over USB protocol such as the USB CDC/NCM protocol however it will be appreciated that other protocols for the transport layer between the computing device 10 and the bridge device 14 may be used. In alternative embodiments, the bridge device 14 is configured to connect to the computing device 10 using a wireless connection.

The bridge device 14 also connects to the mobile computing device 12. The bridge device 14 may be configured to connect to the computing device 10 using a wireless connection in accordance with a peer to peer wireless protocol that is available to user space applications such as a Wi-Fi Direct connection, a Universal Plug and Play connection, or a Bluetooth connection. Thus it will be apparent that bridge device 14 may add wireless capabilities to the otherwise wired receiver (computing device 10). In alternative embodiments, the bridge device 14 is configured to connect to the mobile computing device 12 using a wired connection (e.g. USB, HDMI, a Universal Plug and Play connection etc.).

The bridge device 14 and VNC Server Application 124 communicate over a secure channel e.g. a Secure Socket Layer (SSL) connection. As will be explained in more detail below, secured communication between the bridge device 14 and VNC Server Application 124 may be achieved by deploying trusted certificate chains which are independent of the projection technology (used for authentication) and exchange of at least one symmetric encryption key to establish a secure channel.

The computing device 10 connects to the bridge device 14, and for all intent and purposes sees the combination of the bridge device 14 and user space VNC Server Application 124 as a regular smart device which has built-in system level support for the projection technology (as in the prior art mobile computing device shown in FIG. 1).

To project the graphical user interface of the user application 122 on a display of a remote computing device 10 e.g. a vehicle head unit with a display integrated into a vehicle, the VNC Server Application 124 running in user space on the mobile computing device 12 is used to capture an image displayed on a display of the mobile computing device 12 and send it via a P2P communications interface 127 to the remote computing device 10 via the bridging device 14.

The corresponding VNC viewer application 102 running on the remote computing device 10 is configured to receive the image of the display of the mobile computing device 12 and output it on a display on the remote computing device 10.

The "display" of the mobile computing device 12 could be a physical display e.g. a display of a mobile phone, PDA, laptop or tablet etc. However, the display of the mobile computing device 12 doesn't need to be physical, i.e. it could be a virtual display in the memory of the computing device 12. That is, the mobile computing device 12 could be a headless portable computing device (a computing device without a physical display) such as an Intel® Compute Stick. In these alternative embodiments whereby the display is a virtual display, an external computing device with a display, in wired or wireless communication with the headless portable computing device 12, can be used to view the graphical user interface of the user application 122 that is being projected to the VNC viewer application 102.

It will be apparent that the purpose of the bridge device 14 is twofold:

1. To transparently bridge all of the relevant remote control session data between the remote computing device 10 and the mobile computing device 12. That is, to transparently bridge remote control session data between its transport layer interface 146 (e.g. a USB CDC-NCM interface) and its P2P communication interface 142.

The term "remote control session data" includes any data exchanged between the computing device 10 and the mobile computing device 12 via the bridge device 14, for example, messages exchanged for the establishment of a remote control session between the computing device 10 and the mobile computing device 12, image data exchanged during the remote control session, user input event messages exchanged during the remote control session (e.g. when a user makes an input operation to the projected application 104 on the computing device 10 or an input operation to the user application 122 running on the mobile computing device 12), and messages exchanged for the termination of a remote control session between the computing device 10 and the mobile computing device 12.

2. To act as a secure element storing the certificates that the VNC Server Application 124 will use to present itself as a certified device to the remote computing device 10, and sign an attestation response (e.g. a DAP attestation response) on behalf of the VNC Server Application 124.

The use of the bridge device 14 in embodiments of the present invention enable any third party to implement any smart device projection technology, independent of the smart device operating system and preferred projection technology, in full compliance to the target projection technology.

Figure 3:
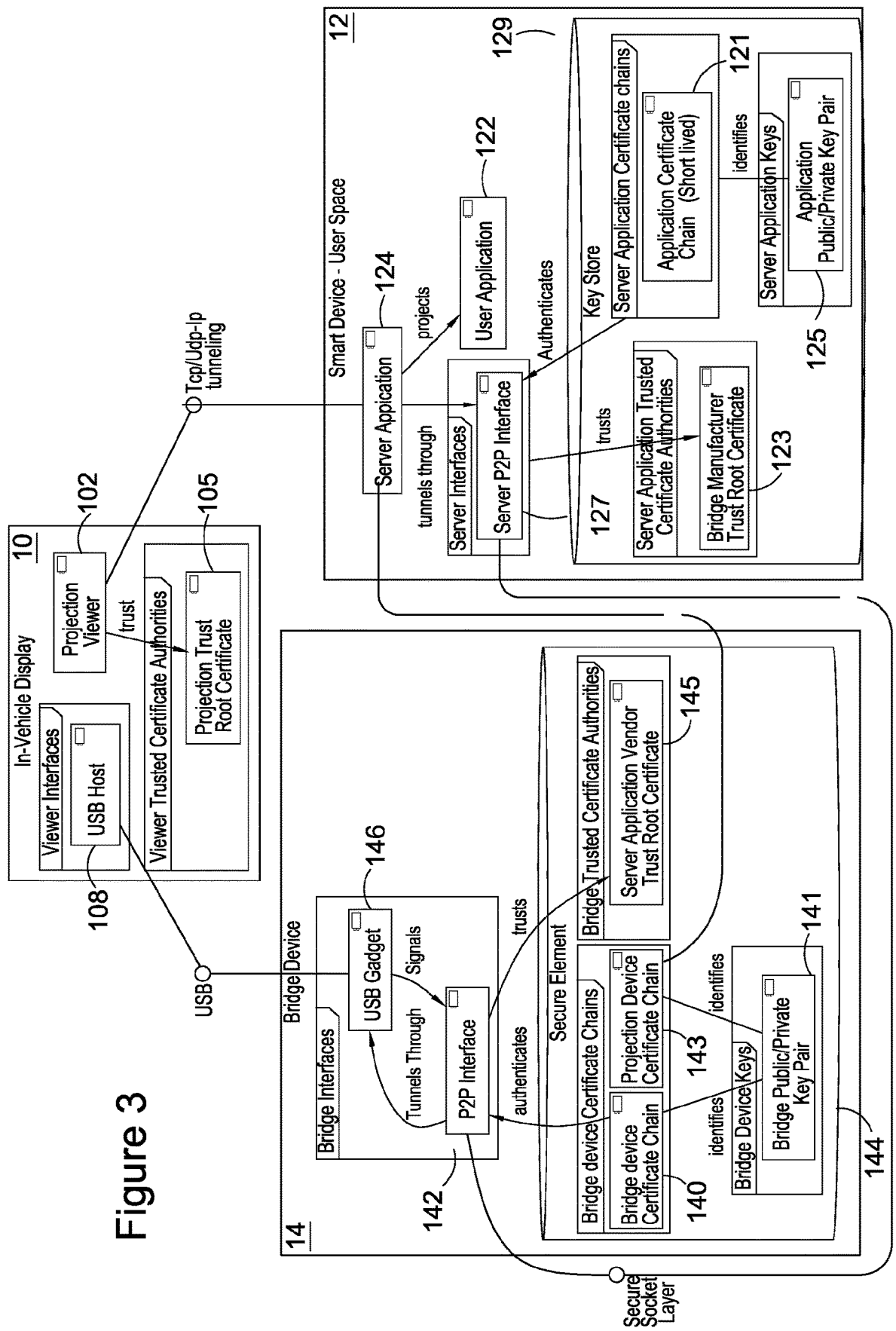
FIG. 3 is a more detailed schematic block diagram of an in-vehicle application projection technology implementation in accordance with embodiments of the present invention.

A more detailed schematic block diagram of the in-vehicle application projection technology implementation 200 is shown in FIG. 3.

As shown in FIG. 3, the mobile computing device 12 comprises a key store 129 accessible in user space which stores a server application certificate chain 121, a bridge manufacturer trust root certificate and a server application public/private key pair 125.

As shown in FIG. 3, the secure data store (e.g. a secure element) 144 on the bridging device 14 stores a bridge device certificate chain 140, a projection device certificate chain 143, a bridge device public/private key pair 141 and a server application trust root certificate 145.

As shown in FIG. 3, the computing device 10 stores a projection trust root certificate 105.

Figure 4:
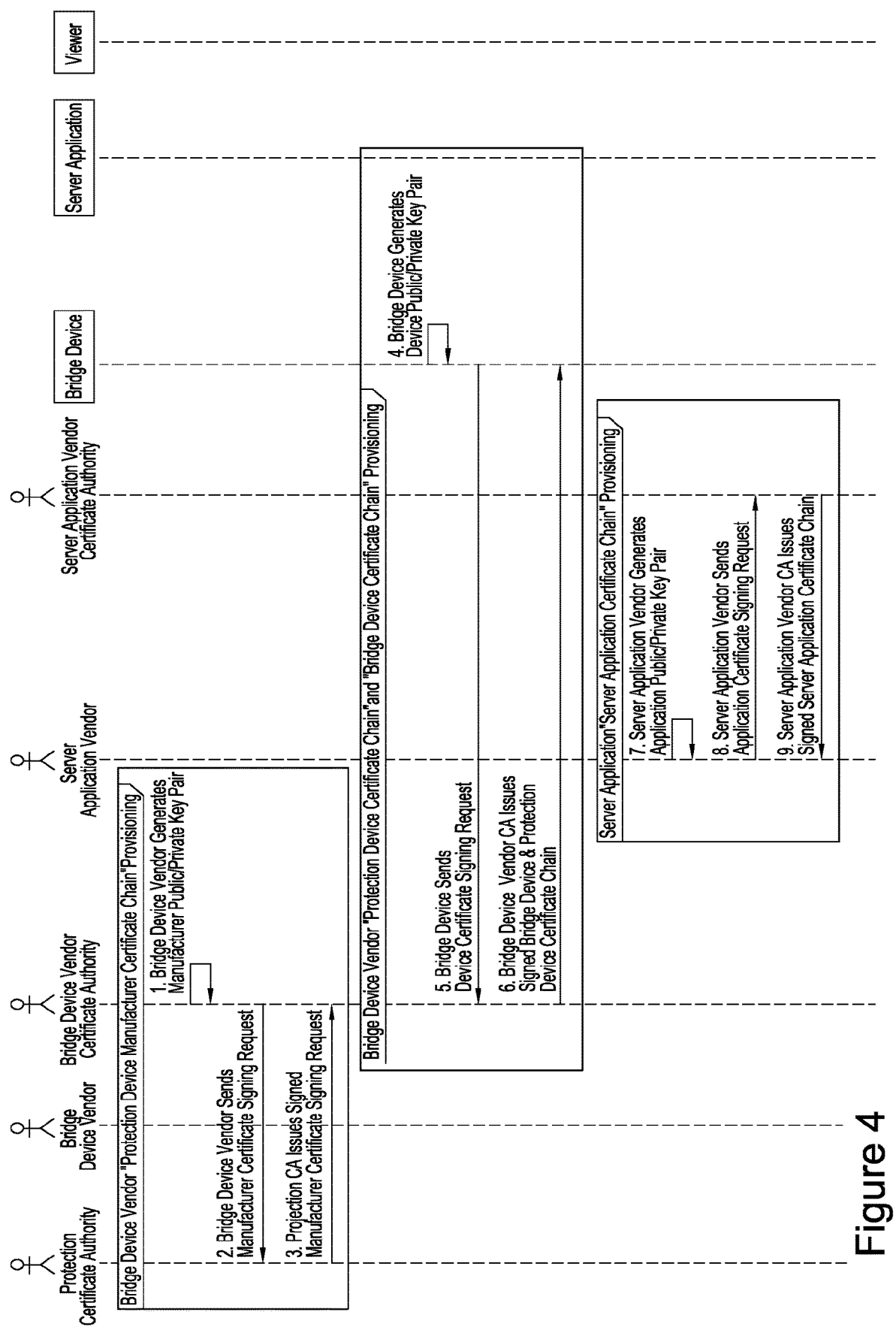
FIG. 4 illustrates a key provisioning process.
Figure 4:
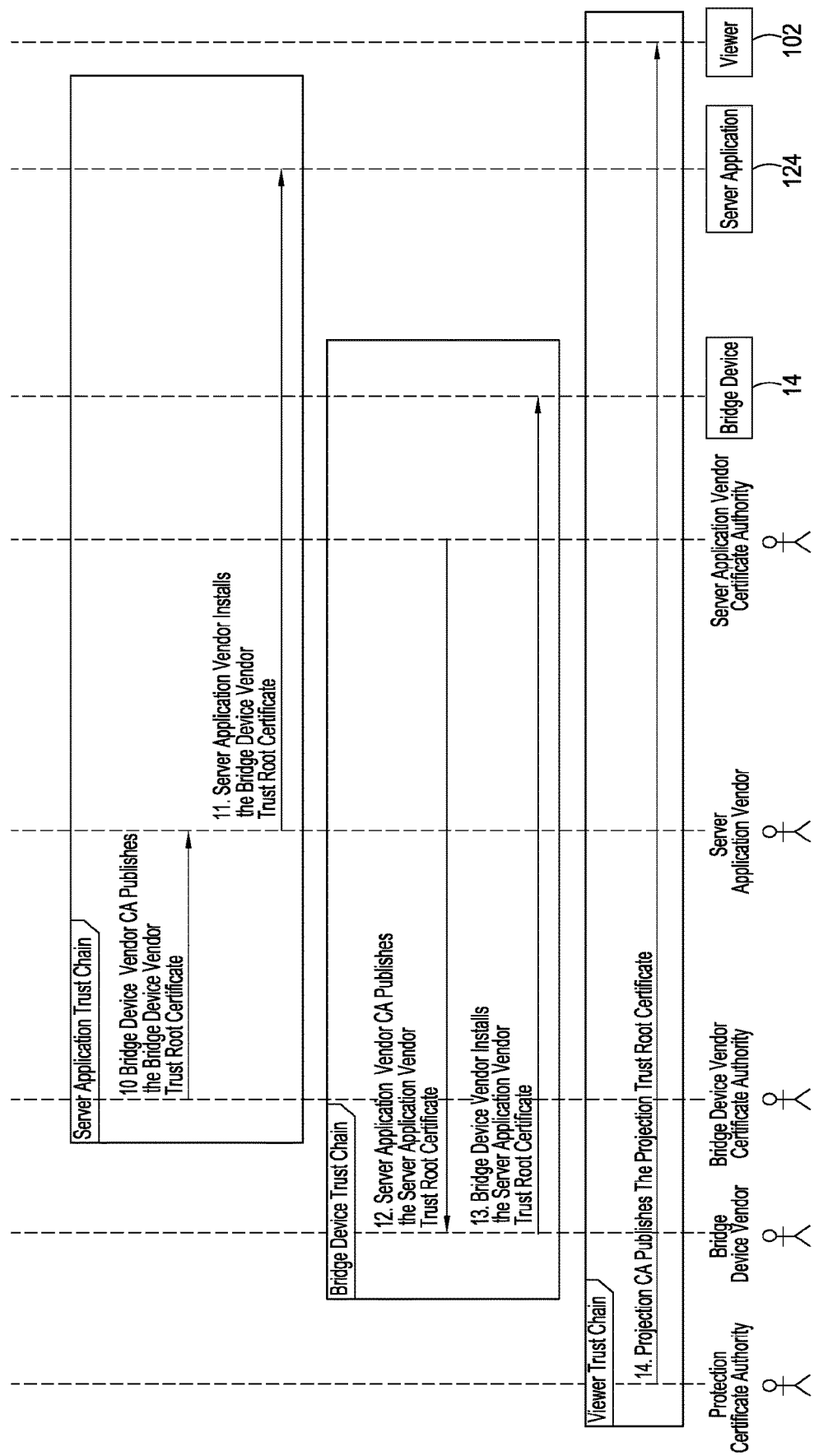

FIG. 4 illustrates a key provisioning process in accordance with embodiments of the invention which makes reference to a projection certificate authority, a bridge device vendor, a bridge device vendor certificate authority, a server application vendor, and a server application vendor certificate authority. One or more steps shown in FIG. 4 may be implemented as part of the manufacturing/production process of the bridge device 14, VNC Server Application 124 and/or the VNC Viewer Application 102. Alternatively or additionally, one or more steps shown in FIG. 4 may be implemented after the bridge device 14, VNC Server Application 124 and/or the VNC Viewer Application 102 has been manufactured/produced.

It will be appreciated that the server application vendor and the server application vendor certificate authority may in fact be the same entity. Similarly, the bridge device vendor and the bridge device vendor certificate authority may in fact be the same entity. Furthermore the bridge device vendor and the server application vendor may in fact be the same entity.

As shown in FIG. 4, at step 1 the bridge device vendor certificate authority generates a manufacturer public/private key pair, ($SK_{Bridge}/PK_{Bridge}$) where SK is a secret (private) key and PK is a public key. At step 2 the bridge device vendor certificate authority sends a projection manufacturer certificate (otherwise referred to herein as a bridge manufacturer certificate) signing request to the projection certificate authority. At step 3 the projection certificate authority issues a signed projection manufacturer certificate (Cert$_{Bridge}$) to the bridge device vendor certificate authority which corresponds to the bridge device vendor's public key $PK_{Bridge}$ signed with the projection certificate authority's private key $SK_{Projection}$. That is, the projection certificate authority verifies the authenticity of the bridge device vendor's public key $PK_{Bridge}$.

The projection manufacturer certificate allows the bridge device vendor to act as a sub-certificate authority for the projection certificate authority. Thus, when signing the bridge device public key $PK_{Device}$ with its CA private key $SK_{Bridge}$, the bridge device vendor establishes two chains of trust (or certificate chains): one leading to the bridge manufacturer trust root certificate 123 (allowing the VNC Server Application 124 to trust the bridge device 14) and one leading to the projection trust root certificate 105 (allowing the VNC Viewer Application 102 to trust the VNC Server Application 124, via the bridge device 14).

At step 4 the bridge device 14 generates the bridge device public/private key pair 141, ($SK_{Device}/PK_{Device}$). At step 5 the bridge device 14 sends a bridge device certificate signing request with the bridge device public key 141 to the bridge device vendor certificate authority. At step 6, the bridge device vendor certificate authority issues a signed bridge device certificate 140 (Cert$_{Device}$), otherwise referred to herein as a device certificate, to the bridge device 14 which corresponds to the bridge device's public key $PK_{Device}$ signed with the bridge device vendor's private key $SK_{Bridge}$. That is, the bridge device vendor certificate authority verifies the authenticity of the bridge device's public key $PK_{Device}$. Also at step 6, the bridge device vendor certificate authority issues a signed projection device certificate chain 143 to the bridge device 14.

The projection device certificate chain 143 comprises the projection trust root certificate 105 at the top, the projection manufacturer certificate (Cert$_{Bridge}$), and the bridge device certificate 140 (Cert$_{Device}$). The bridge device certificate chain 140 comprises the bridge device vendor trust root certificate 123 at the top and the bridge device certificate (Cert$_{Device}$).

At step 7 the server application vendor generates the server application public/private key pair 125. At step 8, the server application vendor sends a server application certificate signing request with the server application public key 125 to the server application vendor certificate authority. At step 9, the server application vendor certificate authority issues a signed server application certificate chain 121 to the server application vendor which corresponds to the server application's public key $PK_{Server}$ signed with the server application vendor's private key $SK_{Vendor}$. That is, the server application vendor certificate authority verifies the authenticity of the server application's public key $PK_{Server}$. The signed server application certificate chain 121 and the public/private key pair 125 are either provisioned at build time as part of the VNC Server Application 124 or subsequently downloaded by a user from the server application vendor.

At step 10 the bridge device vendor certificate authority publishes the bridge device vendor trust root certificate 123 (otherwise referred to herein as the bridge manufacturer trust root certificate) to the server application vendor. At step 11 the server application vendor installs the bridge device vendor trust root certificate 123 as part of the VNC Server Application 124.

At step 12 the server application vendor certificate authority publishes the server application vendor trust root certificate 145 to the bridge device vendor. At step 13 the bridge device vendor installs the server application vendor trust root certificate 145 on the bridge device 14.

Finally, at step 14 the projection certificate authority publishes the projection trust root certificate 105 to the VNC viewer application 102.

Figure 5:
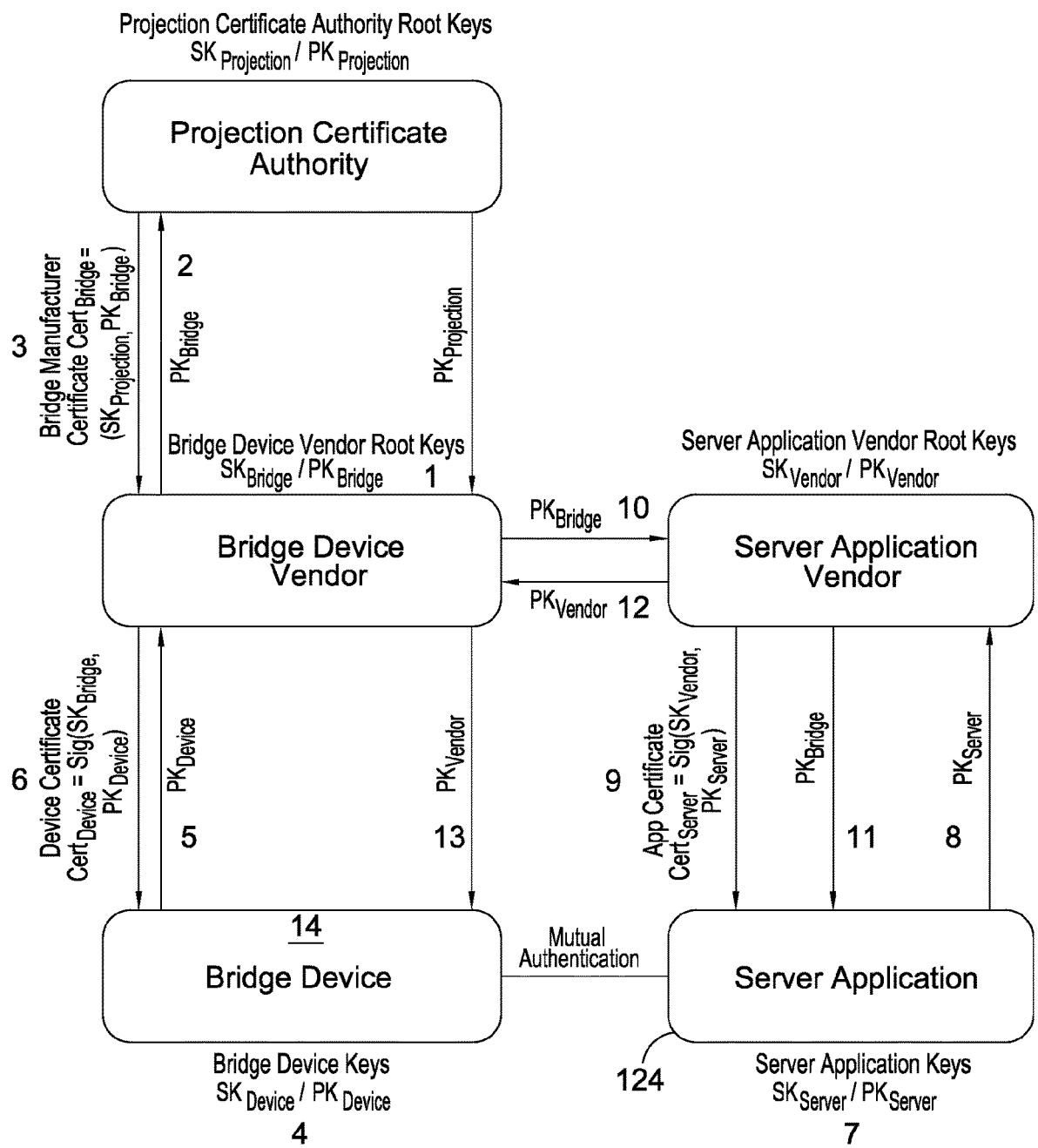
FIG. 5 illustrates the exchange of certificates and keys between the various system components.

FIG. 5 also shows the distribution of certificates and public keys between the projection certificate authority, the bridge device vendor, the server application vendor, the bridge device 14 and the VNC Server Application 124. The numbering used in FIG. 5 corresponds to the steps numbers shown in FIG. 4. FIG. 5 illustrates how the projection technology chain of trust can be integrated seamlessly with the bridge devices' own chain of trust and the VNC Server Application's own chains of trust.

Figure 6A:
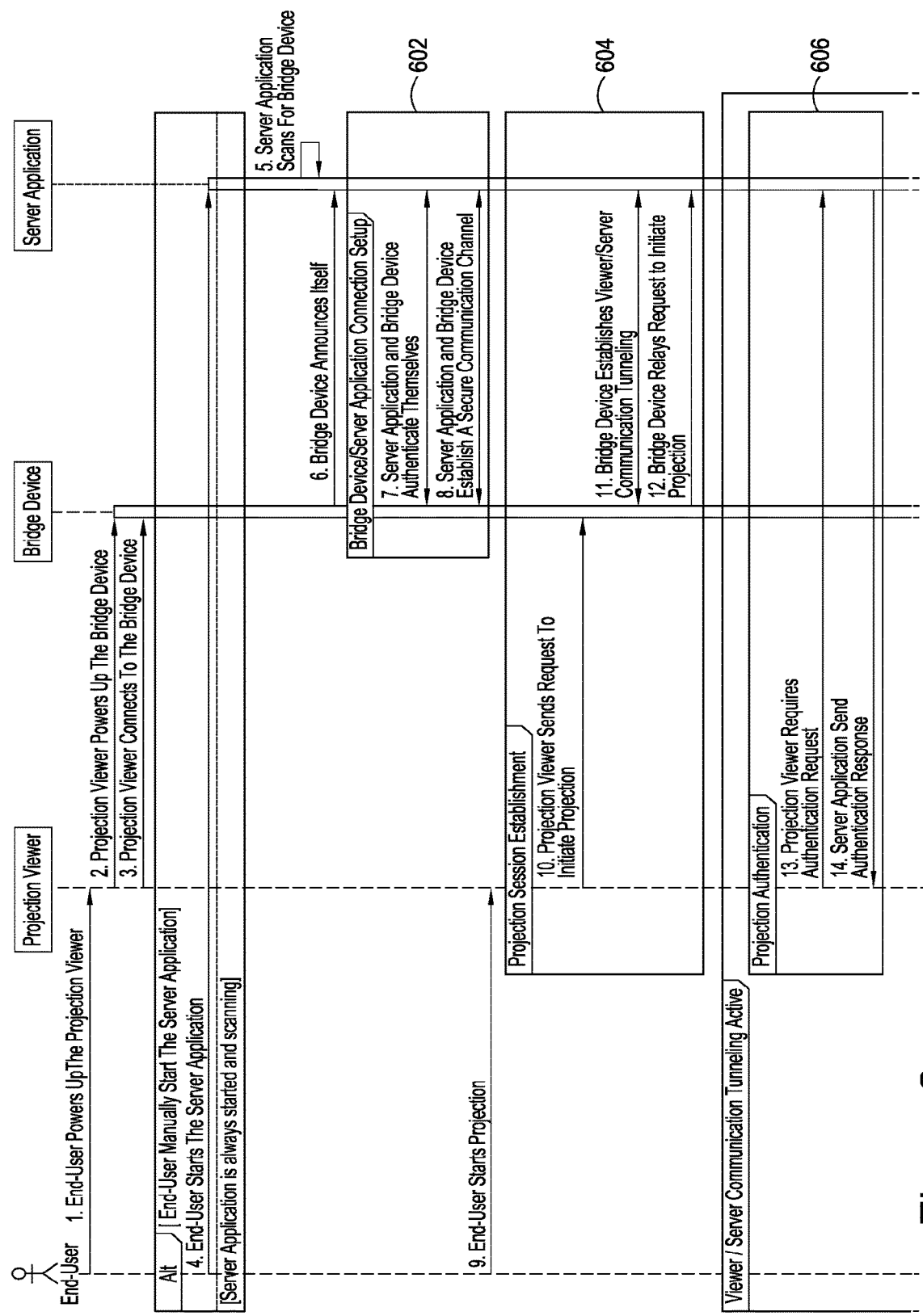
FIG. 6a shows an overview of a projection session sequence.
Figure 6A:
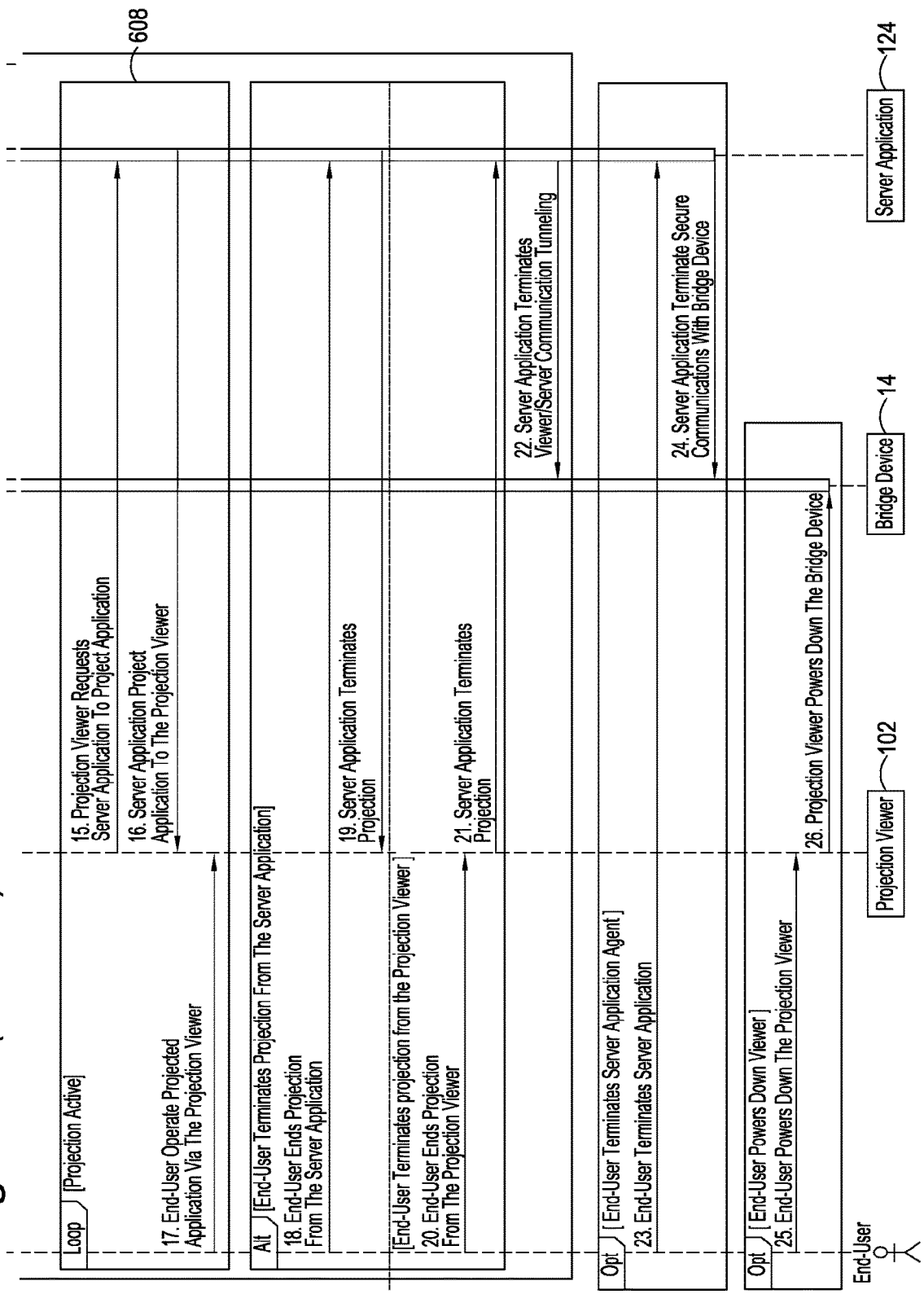

Reference is now made to FIG. 6a which illustrates an overview of a projection session sequence.

At step 1 a user launches the VNC viewer application 102 on the computing device 10. This causes the VNC viewer application 102 to power up the bridge device 14 (step 2) and connect to the bridge device 14 (step 3).

At step 4 the user launches the VNC Server Application 124 the computing device 12. At step 5 the VNC Server Application 124 scans for a bridge device in accordance to the chosen P2P layer (e.g. USB enumeration, Bluetooth, WiFi-P2P etc.) and at step 6 the bridge device 14 and VNC Server Application 124 pair over the chosen communication layer (USB physical Connection, UPnP Control Point, WiFi-P2P Group formation etc.).

The projection session sequence then proceeds to a secure connection establishment phase 602 in which at step 7 the VNC Server Application 124 and the bridge device 14 authenticate themselves with each other and at step 8 the VNC Server Application 124 and the bridge device 14 establish a secure communication channel (e.g. a SSL connection) between the VNC Server Application 124 and the bridge device 14.

It will be appreciated by persons skilled in the art that there are various ways to implement the secure connection establishment phase 602.

Figure 6B:
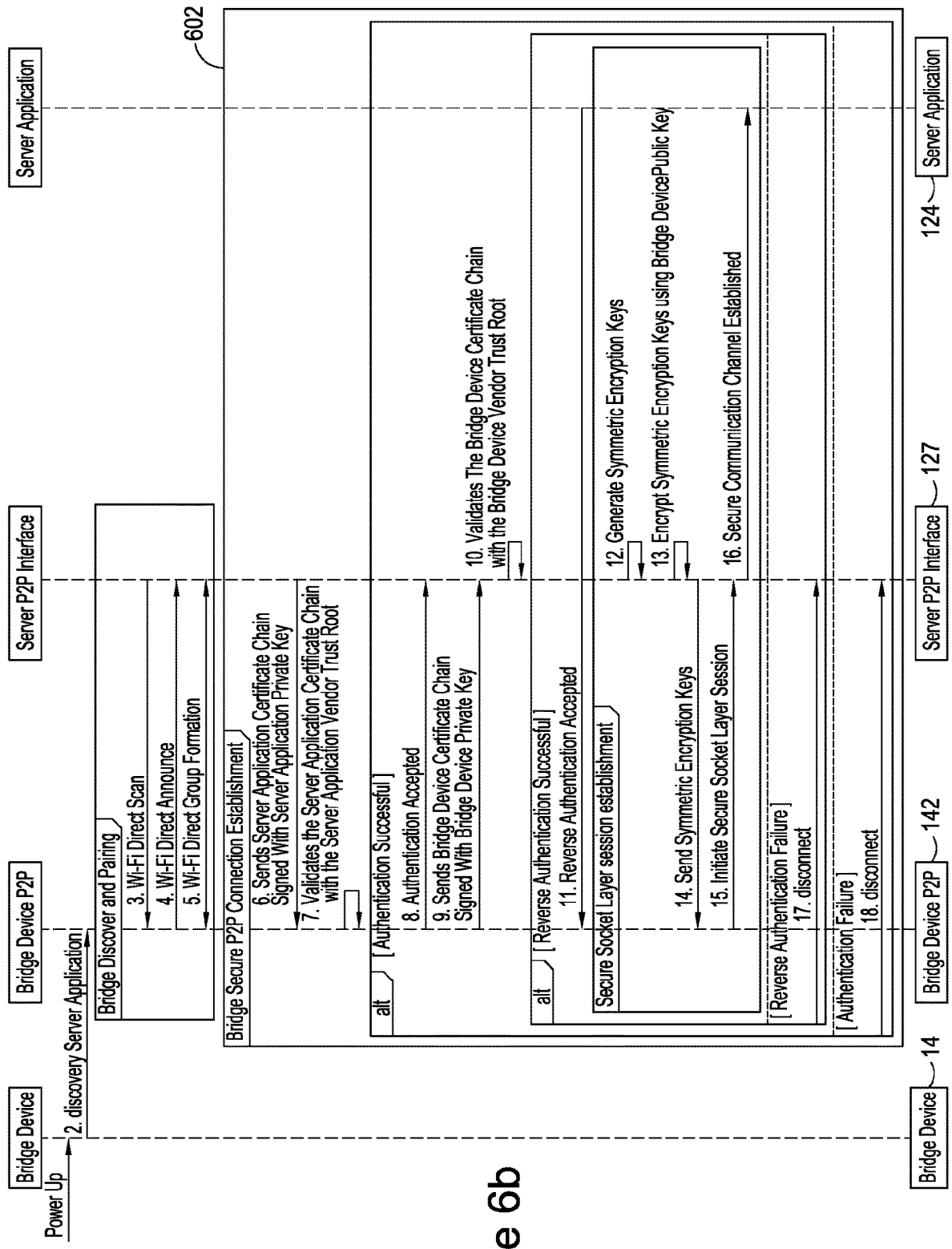
FIG. 6b shows a mutual authentication sequence in the projection session sequence.

Reference is now made to FIG. 6b which illustrates one way to implement the secure connection establishment phase 602.

As shown in FIG. 6b at step 6, the P2P communications interface 127 sends the server application certificate chain 121 signed with the server application private key 125 to the bridge device's P2P communication interface 142. That is, the server application certificate chain 121 (including the VNC Server Application's public key 125) is packaged in a message and the message itself is signed with a signature by the VNC Server Application 124 using its private key 125. Upon reception, at step 7, the bridge device 14 verifies that the message is genuine, by verifying that the signature of the message corresponds to the server application's public key in the server application certificate chain 121. As is known to persons skilled in the art, a signature is a hash of a message encrypted by a private key. The bridge device 14 performs this verification by calculating a hash of the message, decrypts the signature using the VNC Server Application's public key (included in the server application certificate chain 121) and compares the two values—if they match the signature is considered valid. At step 7, the bridge device 14 further verifies that the VNC Server Application 124 is who it says it is, by validating the server application certificate chain 121 using the server application vendor trust root certificate 145. Provided authentication is successful, the P2P communication interface 142 sends an authentication accepted message to the P2P communications interface 127 at step 8, otherwise in the event of authentication failure the P2P communication interface 142 disconnects with the P2P communications interface 127 (step 18).

In a similar manner, at step 9, the bridge device 14 responds by sending its bridge device certificate chain 140 signed with the bridge device private key 141 from the bridge device's P2P communication interface 142 to the P2P communications interface 127. That is, the bridge device certificate chain 140 (including the bridge device's public key 141) is packed in a message and the message itself is signed with a signature by the bridge device 14 using its private key 141. Upon reception, at step 10, the VNC Server Application 124 verifies that the message is genuine, by verifying that the signature of the message corresponds to the bridge device's public key in the bridge device certificate chain 140. The VNC Server Application 124 performs this verification by calculating a hash of the message, decrypts the signature using the bridge device's public key (included in the bridge device certificate chain 140) and compares the two values—if they match the signature is considered valid. At step 10, the VNC Server Application 124 further verifies that the bridge device 14 is who it says it is, by validating the bridge device certificate chain 140 using the bridge device vendor trust root certificate 123. Provided authentication is successful, the VNC Server Application 124 sends an authentication accepted message via the P2P communications interface 127 to the bridge device's P2P communication interface 142 at step 11, otherwise in the event of authentication failure the P2P communication interface 142 disconnects with the P2P communications interface 127 (step 17).

As shown in FIG. 6b, to establish a secure communication channel between the VNC Server Application 124 and the bridge device 14. The VNC Server Application 124 and the bridge device 14 may establish a SSL connection which is shown with reference to steps 12-16 in FIG. 6b.

At step 12, the P2P communications interface 127 generates at least one symmetric encryption key to be used by both the VNC Server Application 124 and the bridge device 14 for both encryption and decryption of data transmitted on the secure communication channel. The P2P communications interface 127 may generate a pair of symmetric encryption keys to be used for encryption and decryption respectively by both the VNC Server Application 124 and the bridge device 14, the pair of keys may be identical or there may be a simple transformation to go between the two keys.

At step 13, the P2P communications interface 127 encrypts the at least one symmetric encryption key using the bridge device's public key (received at step 9 above) to generate at least one encrypted symmetric encryption key.

At step 14, the P2P communications interface 127 sends the at least one encrypted symmetric encryption key to the P2P communication interface 142 of the bridge device 14 in order to establish an SSL connection. The P2P communication interface 142 decrypts the least one encrypted symmetric encryption key using the bridge device private key 141.

At step 15, the P2P communication interface 142 sends back an acknowledgment encrypted with the at least one symmetric encryption key to the P2P communications interface 127 to start the encrypted session. At step 16, the P2P communications interface 12 informs the VNC Server Application 124 that the secure communication channel has been established. Once the secure communication channel has been established, both the VNC Server Application 124 and the bridge device 14 are able to encrypt transmitted data with the at least one symmetric encryption key.

We now refer back to the overview of the projection session sequence which is shown in FIG. 6a.

At step 9 a user provides a user input to the VNC viewer application 102 running on the computing device 10 to start projection of a graphical user interface of the user application 122 that is displayed on a display of the mobile computing device 12 onto a display of the computing device 10.

The projection session sequence then proceeds to a projection session establishment phase 604 in which at step 10 the VNC viewer application 102 sends a request to the bridge device 14 to initiate projection, and at step 11 the bridge device 14 establishes communication tunneling between the VNC viewer application 102 and the VNC Server Application 124.

That is, the bridge device 14 sets up a bridge allowing the projection protocol dataflow to be routed from VNC viewer application 102 through the bridge device transport layer 146 and the P2P communication interface 142 to the VNC Server Application 124 over the P2P connection. Similarly, the bridge allows the projection protocol dataflow to be routed from the VNC Server Application 124 to the P2P communication interface 142 over the P2P connection, through the bridge device transport layer 146 to the VNC viewer application 102.

Figure 6C:
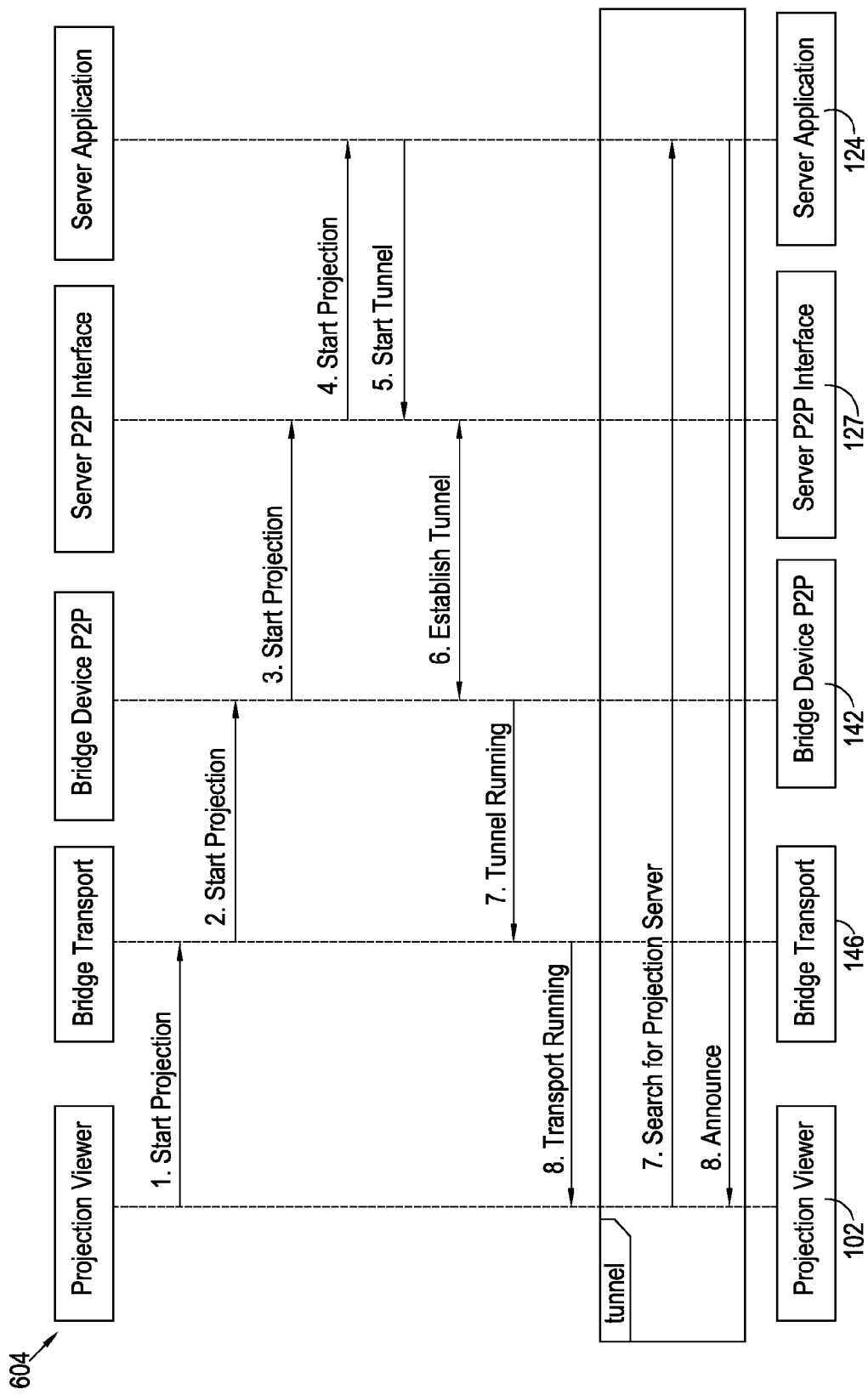
FIG. 6c shows a projection session establishment sequence in the projection session sequence.

The projection session establishment phase 604 is shown in more detail in FIG. 6c. As shown in FIG. 6c, the VNC viewer application 102 transmits a message (start projection message) to the VNC Server Application 124 via the bridge device (steps 1-4) to instruct the VNC Server Application 124 to start projection of the user application 122 to the VNC viewer application 102. This is shown in FIG. 6a at step 12. In response, the VNC Server Application 124 transmits a message (steps 5 and 6) to the P2P interface 142 of the bridge device, instructing the P2P interface 142 to establish a "tunnel" between the bridge device's transport interface 146 and P2P interface 142 so that remote control session data in a first format transmitted from the VNC viewer application 102 can be received by the bridge device 14 (using the transport interface 146) and transmitted to the VNC Server Application 124 in a second format (using the P2P interface 142), and conversely so that remote control session data in the second format transmitted from the VNC Server Application 124 can be received by the bridge device (using the P2P interface 142) and transmitted to the VNC viewer application 102 (using the transport interface 146) in the first format.

The P2P interface 142 configures itself to perform the communication tunneling (to act as a bridge) in the event of receipt data from the VNC viewer application 102 or the VNC Server Application 124 and informs the VNC viewer application 102 of the establishment of the communication tunneling (steps 7 and 8).

In some embodiments, the communication tunneling that is performed by the P2P interface 142 is merely relaying of remote control session data that is received by the bridge device 14 (using the transport interface 146) to the VNC Server Application 124 (using the P2P interface 142) and relaying remote control session data in the opposite direction. That is, the first format and second format referred to above are the same. The P2P interface 142 may perform encapsulation of received remote control session data. For example, the P2P interface 142 may perform IP tunneling to encapsulate a received IP packet into another IP packet and transmit the encapsulated IP packet onward towards its destination (the VNC viewer application 102 or VNC Server Application 124).

In other embodiments, the communication tunneling that is performed by the P2P interface 142 comprises the P2P interface 142 performing a translation (and the inverse translation) between different data formats. Expressed another way, the P2P interface 142 receives remote control session data in a first format transmitted from the VNC viewer application 102, performs a function on the remote control session data in the first format to generate remote control session data in a second format (whereby the second format is different to the first format) and transmits the remote control session data in the second format to the VNC Server Application 124. Similarly, the P2P interface 142 receives remote control session data in the second format transmitted from the VNC Server Application 124, performs the inverse function on the remote control session data in the second format to generate remote control session data in the first format and supplies the remote control session data in the first format to the transport interface 146 for transmission to the VNC viewer application 102.

The function referred to above, may include encapsulation. For example the first format may be USB data and the second format may be IP data. In this example, the P2P interface 142 encapsulates a USB packet received from the VNC viewer application 102 into an IP packet for transmission to the VNC Server Application 124, and similarly encapsulates an IP packet received from the VNC Server Application 124 into a USB packet for transmission to the VNC viewer application 102. Thus in embodiments, the bridge device 14 enables communication between the VNC Server Application 124 and the VNC viewer application 102 when the mobile computing device 12 is not compatible for communication with the computing device 10 (e.g. when the use of USB CDC/NCM as a transport layer is not available to the VNC Server Application 124).

The function referred to above, may include encryption (the corresponding inverse function being decryption), for example the first format may be unencrypted IP data and the second format may be encrypted IP data. It will be appreciated that other functions not described herein may be performed by the P2P interface 142.

The VNC Server Application 124 announces itself to the VNC viewer application 102. This could be in response to a search message transmitted by the VNC viewer application 102 and detected by VNC Server Application 124, as shown in FIG. 6c (steps 7-8).

Once the communication tunneling is active between the VNC viewer application 102 and the VNC Server Application 124 the projection session sequence then proceeds to a projection authentication phase 606 in which at step 13 the VNC viewer application 102 sends an authentication request, via the bridge device 14, to the VNC Server Application 124; and in reply at step 14 the VNC Server Application 124 sends an authentication response, via the bridge device 14, to the VNC viewer application 102.

Figure 6D:
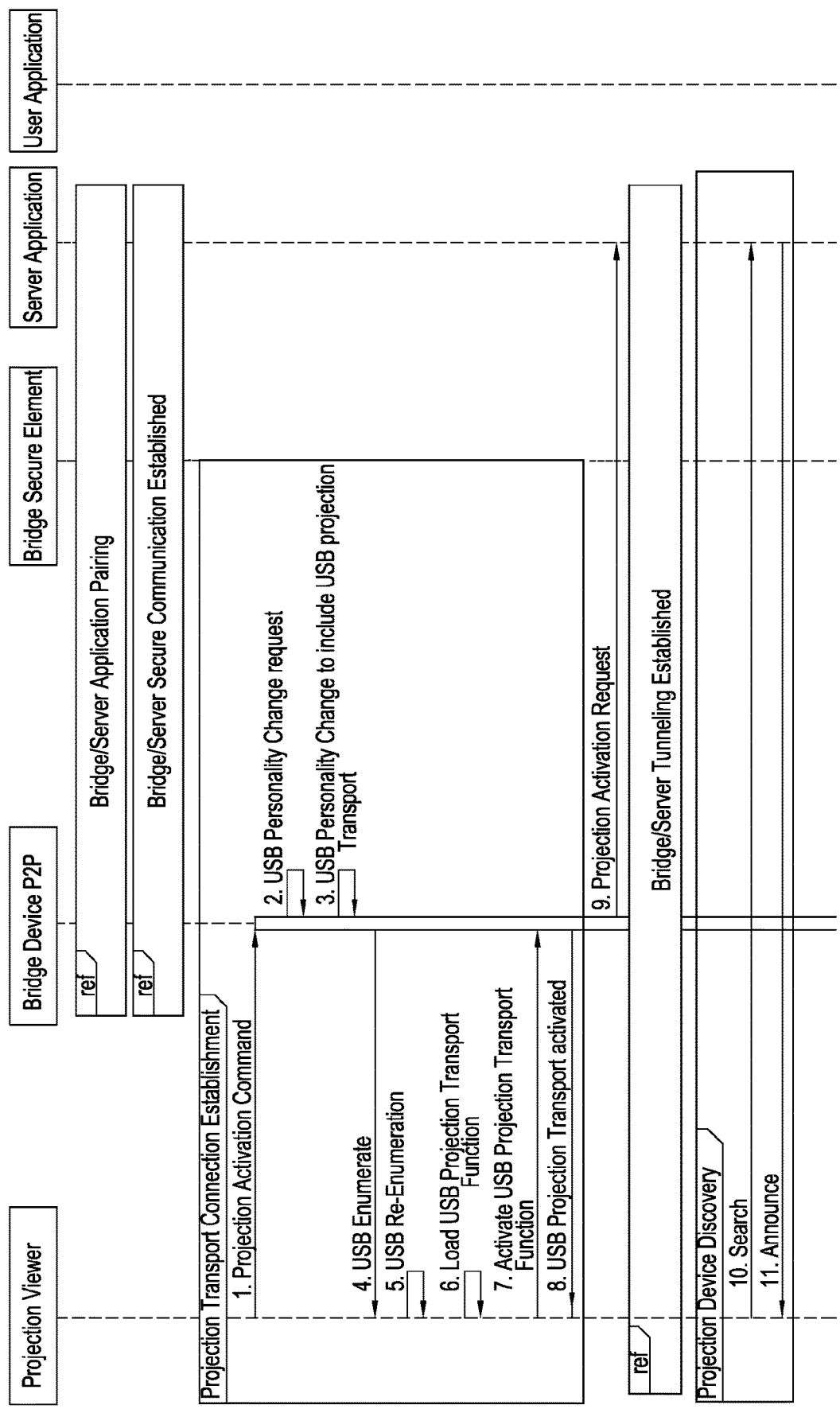
FIG. 6d shows a projection authentication sequence in the projection session sequence.
Figure 6D:
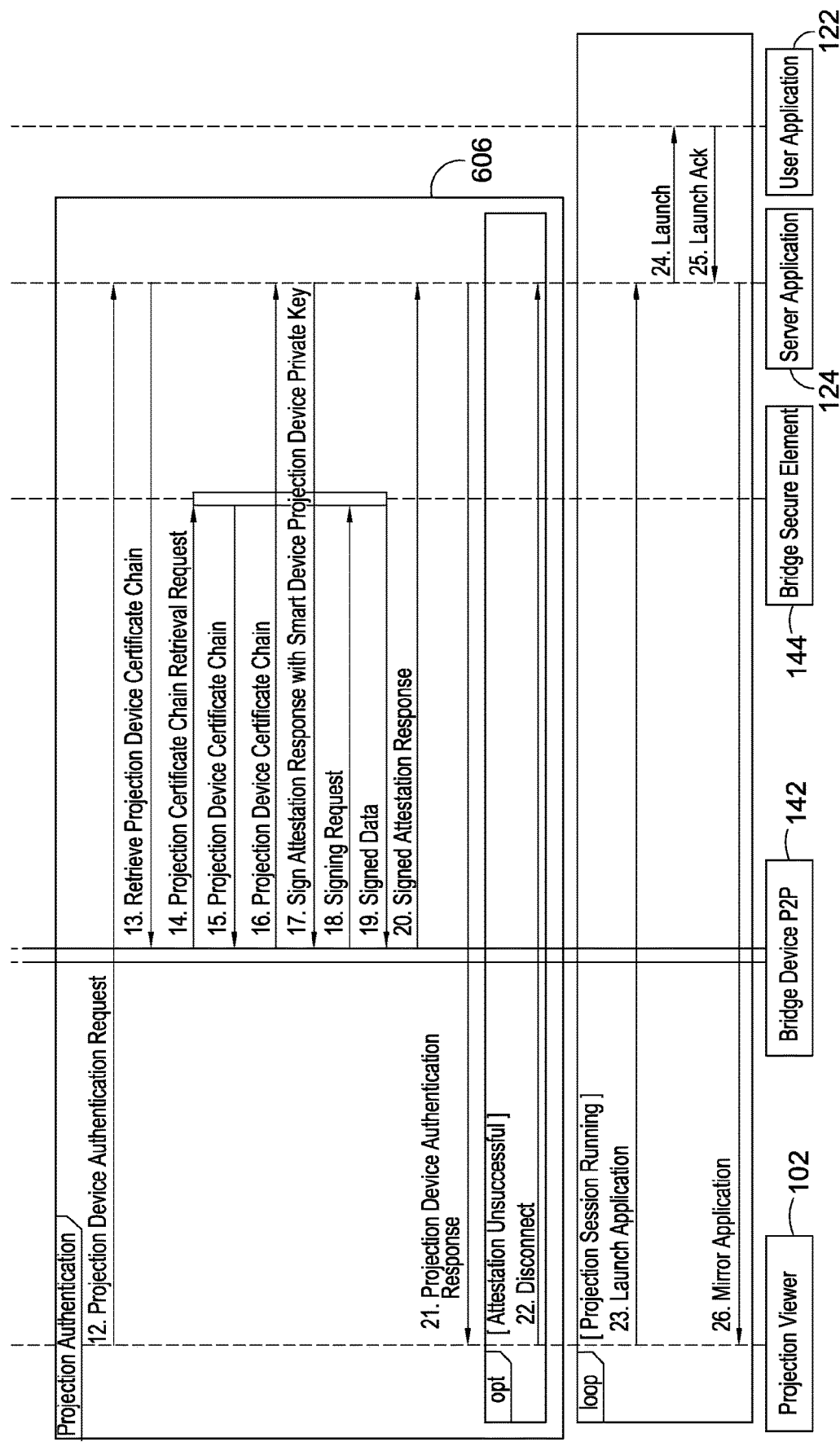

The projection authentication phase 606 is shown in more detail in FIG. 6d.

Once the VNC viewer application 102 has discovered the VNC Server Application 124, the VNC viewer application 102 sends, at step 12, an authentication request via the bridge device 14 to the VNC Server Application 124 (requiring the VNC Server Application 124 to verify itself).

In the present invention the VNC Server Application 124 delegates protocol specific operations that are not able to be performed on the computing device to the bridging module 114 on the bridge device 14. In particular, the VNC Server Application 124 utilizes the bridge device 14 to perform the cryptographic operations required by the projection protocol authentication mechanism.

At step 13, the VNC Server Application 124 sends a request to the bridge device 14 for the projection device certificate chain 143 stored in the secure data store 144 via the secure channel established at step 8 of FIG. 6a (i.e. using the at least one symmetric encryption key). In steps 14-16 the P2P interface 142 accesses the secure data store 144 to retrieve the projection device certificate chain 143 and sends the projection device certificate chain 143 to the VNC Server Application 124, via the secure channel.

The VNC Server Application 124 generates a response which includes the projection certificate chain 143, and at step 17 instructs the bridge device 14, via the secure channel, to cryptographically sign the response using the bridge device private key 141 (referred to in FIG. 6d as the smart device projection device private key).

At steps 18-20 the P2P interface 142 retrieves the bridge device private key 141 from the secure data store 144 and uses the bridge device private key 141 to cryptographically sign the response received at step 17, at least the signature as a signed attestation response is then transmitted, via the secure channel, from the P2P interface 142 to the VNC Server Application 124. The signed attestation response transmitted at step 20 may include only the signature generated using the bridge device private key 141, or may include both the signature generated using the bridge device private key 141 and the projection device certificate chain 143.

At step 21, the VNC Server Application 124 transmits an authentication response to the VNC viewer application 102 via the bridge device 14 as a reply to the authentication request received at step 12. The authentication response transmitted to the VNC viewer application 102 at step 21 includes both the signature received at step 20 and the projection device certificate chain 143The VNC viewer application 102 validates the projection device certificate chain 143 using the projection trust root certificate 105. Thus, the VNC viewer application 102 sees the combination of the bridge device 14 and user space VNC Server Application 124 as a regular smart device which has built-in system level support for the projection technology Also shown in FIG. 6d is a "Projection Transport Connection Establishment" phase which is implemented after step 3 in FIG. 6a in the scenario whereby the bridge device is configured to plug into a USB port on the computing device 10. As is known to persons skilled in the art, when a USB peripheral device is plugged-in to a USB port on a computing device, the computing device will auto-detect and auto-configure the peripheral device. The Projection Transport Connection Establishment phase configures and activates the USB projection transport function on the bridge device 14 so that remote control session data can be exchanged on the USB interface between the bridge device and the computing device 10.

Referring back to FIG. 6a, the projection session sequence then proceeds to a projection phase 608 in which at step 15 the VNC viewer application 102 transmits a request that the VNC Server Application 124 projects the graphical user interface of the user application 122 displayed on a display of the mobile computing device 12 to the VNC viewer application 102. At step 15, the VNC viewer application 102 transmits the request, via the bridging device 14, to the VNC Server Application 124.

At step 16, the VNC Server Application 124 captures image data of the graphical user interface of the user application 122 and transmits the captured image data to the VNC viewer application 102 via the bridge device 14 such that the VNC viewer application 102 displays the projected application 104 on a display of the computing device 10.

As shown by step 17, a user is able to operate the projected application 104 via the VNC viewer application 102 using an input mechanism on the computing device 10 e.g. by pressing a physical button on the computing device 10, turning a rotary button on the computing device 10 or making a touch screen selection on the display of the computing device 10 (in the case where the display of the computing device 10 is touch sensitive). During the remote control session, the VNC viewer application 102 is configured to send user input events to the VNC Server Application 124, and in response receive image data reflecting changes to the graphical user interface of the user application 122 caused by the user input events.

During the projection phase 608 transparently bridges all of the relevant remote control session data between the remote computing device 10 and the mobile computing device 12 independent of the built-in capabilities of the mobile computing device 12. In accordance with embodiments of the present invention, the VNC Server Application 124 is able to implement the projection protocol without system level dependencies.

As shown in FIG. 6a, the remote control session may be terminated by a user providing a user input to the VNC Server Application 124 (step 18), the VNC Server Application 124 configured to communicate termination of the remote control session to the VNC viewer application 102 (step 19) and terminate the communication tunneling established in the projection session establishment phase 604 (step 22).

As shown in FIG. 6a, the remote control session may be terminated by a user providing a user input to the VNC viewer application 102 (step 20), the VNC viewer application 102 configured to communicate termination of the remote control session to the VNC Server Application 124 (step 21) in response to which the VNC Server Application 124 is configured to terminate the communication tunneling established in the projection session establishment phase 604 (step 22).

As shown in FIG. 6a, the VNC Server Application 124 is configured to terminate the secure communication channel with the bridge device 14 in response to receiving a user input to terminate (i.e. shut down) the VNC Server Application 124 running on the mobile computing device 12.

It will be appreciated from the above that the use of the bridge device 14 allows enhancement of the target smart device projection technology in such area as:

Smart Device Power management, by extending the number of available transmission channels available to the VNC Server Application 124 (i.e. using Bluetooth Low Energy for low bandwidth traffic and Wi-Fi for high bandwidth traffic) transparently to the projection technology.

Privacy by restricting the handling of data within the VNC Server Application 124 itself, without the need to interact with a proprietary system component.

Tampering by isolating the protocol specific security elements outside of user space on the smart device inside a separate distinct module.

Security by allowing the overall wireless communication to be fully encrypted independent of the original projection technology encryption capabilities.

All of the above advantages are achieved without altering conformance to the original projection technology.

Whilst the MirrorLink in-vehicle application projection technology has been discussed herein this is just one example of an in-vehicle application projection technology, and the VNC Server Application 124 may be configured to operate in accordance with any known in-vehicle application projection technology such as Android Auto Projection, CarPlay, Miracast etc. That is, the Server Application 124 and the viewer application 102 do not have to operate in accordance with the VNC protocol, this is merely an example. Thus the VNC Server Application 124 can be considered more generally as a Projection Server application and the VNC viewer application 102 can be considered more generally as a Projection Viewer application.

Whilst embodiments have been discussed above with reference to a standalone bridging device 14 comprising the bridging module 114, in alternative embodiments the computing device 10 comprises the bridging module 114. That is, the bridging module 114 is integrated into the computing device 10.

While this invention has been particularly shown and described with reference to preferred embodiments, it will be understood to those skilled in the art that various changes in form and detail may be made without departing from the scope of the invention as defined by the appendant claims.

The invention claimed is:

1. A method of establishing a remote control session between a first computing device and a second computing device to enable a graphical user interface of an application executed by a processor of the first computing device to be remotely controlled and viewed on the second computing device, the method implemented on the first computing device and comprising:
    establishing a connection with a bridging module, the bridging module external to the first computing device;
    performing an authentication procedure with the bridging module using the connection;
    establishing a secure communication channel to the bridging module on the connection;
    receiving, from the bridging module, an authentication request transmitted from the second computing device;
    in response to receiving the authentication request (i) accessing a projection certificate chain stored in a secure data store of the bridging module using the secure communication channel, (ii) generating a response including the projection certificate chain, and (iii) instructing, via the secure communication channel, the bridging module to cryptographically sign the response using a private key which is associated with the bridging module and is stored in the secure data store, and in response receiving a signature from the bridging module via the secure communication channel; and
    transmitting a signed authentication response to the second computing device via the bridging module to establish the remote control session, the signed authentication response comprising the projection certificate chain and the signature.

2. A method according to claim 1, wherein accessing the projection certificate chain comprises transmitting a request for the projection certificate chain to the bridging module via the secure communication channel, and receiving the projection certificate chain from the bridging module via the secure communication channel.

3. A method according to claim 1, wherein performing the authentication procedure comprises:
    retrieving a certificate chain associated with the first computing device from storage on the first computing device;
    signing the certificate chain associated with the first computing device with a private key associated with the first computing device; and
    transmitting the signed certificate chain to the bridging module for validation by the bridging module, said private key stored in the memory on the first computing device.

4. A method according to claim 1, wherein performing the authentication procedure comprises:
    receiving a signed certificate chain associated with the bridging module together with a public key associated with the bridging module;
    and validating the certificate chain associated with the bridging module using a root certificate stored in memory on the first computing device.

5. A method according to claim 1, wherein said establishing a secure communication channel to the bridging module on the connection comprises:
    generating at least one symmetric encryption key;
    encrypting said at least one symmetric encryption key using a public key associated with the bridging module to generate at least one encrypted symmetric encryption key; and
    transmitting the at least one encrypted symmetric encryption key to the bridging module.

6. A method according to claim 5, wherein the method further comprises invalidating the at least one symmetric encryption key in response to detecting loss of said connection.

7. A method according to claim 1, wherein the method further comprises:
    receiving a request, from the bridging module, to initiate projection of said graphical user interface to the second computing device, the request originating from the second computing device; and
    transmitting a command to the bridging module to set up a bridge to allow data to be routed between the first computing device and the second computing device.

8. A method according to claim 1, wherein the establishing the connection with the bridging module is in response to user input received at the first computing device.

9. A method according to claim 1, wherein a bridging device external to both the first computing device and the second computing device comprises the bridging module, said establishing a connection with the bridging module comprising establishing a connection with the bridging device.

10. A method according to claim 1, wherein the second computing device comprises the bridging module, said establishing a connection with the bridging module comprising establishing a connection with the second computing device.

11. A method according to claim 1, wherein the second computing device is a vehicle head unit integrated into a vehicle, the vehicle head unit comprising a display for displaying the graphical user interface of said application.

12. A computer program product for establishing a remote control session between a first computing device and a second computing device to enable a graphical user interface of an application executed by a processor of the first computing device to be remotely controlled and viewed on the second computing device, the computer program product comprising code embodied on a non-transient computer-readable medium and configured so as when executed on a processor of the first computing device to perform the method of claim 1.

13. A computing device comprising:
    a processor configured to run an application for establishing a remote control session between the computing device and a second computing device to enable a graphical user interface of a user application executed by the processor of the computing device to be remotely controlled and viewed on the second computing device, wherein the application is configured to:
    establish a connection with a bridging module, the bridging module external to the computing device;
    perform an authentication procedure with the bridging module using the connection;
    establish a secure communication channel to the bridging module on the connection;
    receive, from the bridging module, an authentication request transmitted from the second computing device;

in response to receiving the authentication request (i) access a projection certificate chain stored in a secure data store of the bridging module using the secure communication channel, (ii) generate a response including the projection certificate chain, and (iii) instruct, via the secure communication channel, the bridging module to cryptographically sign the response using a private key which is associated with the bridging module and is stored in the secure data store, and in response receive a signature from the bridging module via the secure communication channel; and transmit a signed authentication response to the second computing device via the bridging module to establish the remote control session, the signed authentication response comprising the projection certificate chain and the signature.

14. A method of establishing a remote control session between a first computing device and a second computing device to enable a graphical user interface of an application executed by a processor of the first computing device to be remotely controlled and viewed on the second computing device, the method implemented on a bridging module and comprising:

establishing a connection with the first computing device, the bridging module external to the first computing device;

performing an authentication procedure with the first computing device using the connection;

establishing a secure communication channel to the first computing device on the connection;

transmitting an authentication request received from the second computing device to the first computing device;

receiving a request from the first computing device via the secure communication channel, for a projection certificate chain stored in a secure data store of the bridging module, and in response retrieving the projection certificate chain from the secure data store and transmitting the projection certificate chain to the first computing device via the secure communication channel;

receiving a response including the projection certificate chain and a request to sign said response, from the first computing device via the secure communication channel;

cryptographically signing the response using a private key associated with the bridging module and which is stored in the secure data store to generate a signature for the first computing device, and transmitting the signature to the first computing device via the secure communication channel; and transmitting a signed authentication response received from the first computing device to the second computing device to establish the remote control session, the signed authentication response comprising the projection certificate chain and the signature.

15. A method according to 14, wherein performing the authentication procedure comprises:

receiving a signed certificate chain associated with the first computing device from the first computing device; and validating the certificate chain associated with the first computing device using a root certificate stored in said secure data store.

16. A method according to claim 14, wherein performing the authentication procedure comprises:

retrieving a certificate chain associated with the bridging module from said secure data store;

signing the certificate chain associated with the bridging module with a private key associated with the bridging module; and transmitting the signed certificate chain to the first computing device for validation by the first computing device, said private key stored in said secure data store.

17. A method according to claim 14, wherein the method comprises establishing a bridge to allow data to be routed between the first computing device and the second computing device.

18. A method according to claim 17 wherein following the establishment of the bridge, the method comprising:

receiving data in a first format from the second computing device for transmission to the first computing device and relaying said data in a second format to the first computing device; and receiving data in the second format from the first computing device for transmission to the second computing device and relaying said data in the first format to the second computing device.

19. A method according to claim 17, wherein the method further comprises:

transmitting a request to the first computing device to initiate projection of said graphical user interface to the second computing device, the request originating from the second computing device; and in response, receiving a command from the first computing device to set up the bridge to allow data to be routed between the first computing device and the second computing device.

20. A computer program product for establishing a remote control session between a first computing device and a second computing device to enable a graphical user interface of an application executed by a processor of the first computing device to be remotely controlled and viewed on the second computing device, the computer program product comprising code embodied on a non-transient computer-readable medium and configured so as when executed on a processor to perform the method of claim 14.

21. A bridging module for establishing a remote control session between a first computing device and a second computing device to enable a graphical user interface of an application executed by a processor of the first computing device to be remotely controlled and viewed on the second computing device, wherein the bridging module is integrated into one of the second computing device or a bridging device that is external to both the first computing device and the second computing device, and wherein the bridging module is configured to:

establish a connection with the first computing device, the bridging module external to the first computing device;

perform an authentication procedure with the first computing device using the connection;

establish a secure communication channel to the first computing device on the connection;

transmit an authentication request received from the second computing device to the first computing device;

receive a request from the first computing device via the secure communication channel, for a projection certificate chain stored in a secure data store of the bridging module, and in response retrieve the projection certificate chain from the secure data store and transmit the projection certificate chain to the first computing device via the secure communication channel;

receive a response including the projection certificate chain and a request to sign said response, from the first computing device via the secure communication channel;

cryptographically sign the response using a private key associated with the bridging module and which is stored in the secure data store to generate a signature for the first computing device, and transmit the signature to the first computing device via the secure communication channel; and transmit a signed authentication response received from the first computing device to the second computing device to establish the remote control session, the signed authentication response comprising the projection certificate chain and the signature.

22. A bridging module according to claim 21, wherein the bridging module is integrated into the bridging device.

23. A bridging module according to claim 21, wherein the bridging module is integrated into the second computing device.

* * * * *